(12) United States Patent
Reithofer et al.

(10) Patent No.: US 7,534,032 B2
(45) Date of Patent: May 19, 2009

(54) SENSOR ASSEMBLY FOR DETERMINING THE TEMPERATURE STATE IN AN AREA OF A HEATING SURFACE

(75) Inventors: Josef Reithofer, Wolfpassing (AT); Christian Auradnik, Klosterneuburg (AT)

(73) Assignee: Electrovac AG, Klosterneuburg (AT)

( * ) Notice: Subject to any disclaimer, the term of this patent is extended or adjusted under 35 U.S.C. 154(b) by 141 days.

(21) Appl. No.: 11/379,108

(22) Filed: Apr. 18, 2006

(65) Prior Publication Data
US 2006/0231546 A1 Oct. 19, 2006

(30) Foreign Application Priority Data
Apr. 19, 2005 (AT) .............................. GM241/2005

(51) Int. Cl.
*G01K 13/00* (2006.01)
*G01L 7/16* (2006.01)
*H05B 3/68* (2006.01)

(52) U.S. Cl. ................ 374/141; 374/121; 374/163; 219/448.11

(58) Field of Classification Search . 219/447.1–448.14, 219/448.17; 374/29, 120–121, 126, 128–129, 374/132, 133, 141–142, 152, 163, 208, 100
See application file for complete search history.

(56) References Cited

U.S. PATENT DOCUMENTS

| | | | |
|---|---|---|---|
| 4,300,990 A | * | 11/1981 | Maurer ...................... 204/412 |
| 5,258,736 A | | 11/1993 | Kristen et al. |
| 6,300,606 B1 | * | 10/2001 | Engelmann et al. ......... 219/492 |
| 6,634,210 B1 | * | 10/2003 | Bosch et al. ............... 73/23.33 |
| 7,069,770 B2 | * | 7/2006 | Chen et al. ................. 73/31.05 |
| 7,186,954 B2 | * | 3/2007 | Wilkins .................... 219/448.1 |
| 2002/0036138 A1 | * | 3/2002 | Kuroki et al. ............... 204/426 |
| 2003/0033858 A1 | * | 2/2003 | Lambert et al. ............ 73/53.01 |
| 2005/0184044 A1 | * | 8/2005 | Reiter et al. ........... 219/448.11 |
| 2006/0118544 A1 | * | 6/2006 | Wilkins ..................... 219/494 |

FOREIGN PATENT DOCUMENTS

| | | |
|---|---|---|
| DE | 39 34 157 A1 | 4/1991 |
| EP | 1 489 479 A | 12/2004 |
| WO | WO 2004/111589 | 12/2004 |

\* cited by examiner

*Primary Examiner*—Patrick J Assouad
*Assistant Examiner*—Bret Adams
(74) *Attorney, Agent, or Firm*—Henry M. Feiereisen; Ursula B. Day (57) ABSTRACT

A sensor assembly is disclosed for determining the temperature state in an area of a heating surface heated by a heat source and disposed between the heat source and the heating surface in parallel relationship to the heating surface. The sensor assembly includes a first sensor having a carrier and a temperature-dependent resistor web which is attached to the carrier and confronts the heating surface and which is electrically contacted at a contact zone outside a temperature-measuring zone, and a second sensor having a carrier and a temperature-dependent resistor web which is attached to the carrier and electrically contacted at a contact zone outside the temperature-measuring zone and which confronts the heat source.

40 Claims, 9 Drawing Sheets

SENSOR ASSEMBLY FOR DETERMINING THE TEMPERATURE STATE IN AN AREA OF A HEATING SURFACE

CROSS-REFERENCES TO RELATED APPLICATIONS

This application claims the priority of Austrian Patent Application, Serial No. GM 241/2005, filed Apr. 19, 2005, pursuant to 35 U.S.C. 119(a)-(d), the content of which is incorporated herein by reference.

BACKGROUND OF THE INVENTION

The present invention relates, in general, to a sensor assembly for determining the temperature state in an area of a heating surface.

Nothing in the following discussion of the state of the art is to be construed as an admission of prior art.

In typical electric stoves, particularly those having a ceramic cooktop, an electromechanical protective temperature limiter is provided per heater to limit it to the maximum temperature. If the cooking platform is controlled using an electronic system, a substitution of the mechanical temperature limiter by electronic temperature sensors is possible, since the necessary circuit breaker (relay) is already provided. In the electronic control units used, a sensor is frequently also positioned in the region of the electronics of an electric stove.

Conventional temperature sensors are insufficient to provide a true representation of the temperature distribution underneath the heating surface. As a result, the electronic control circuits receive only incomplete data so that the heating surface can only controlled poorly, causing excessive amount of energy to be unnecessarily converted into heat.

It would therefore be desirable and advantageous to provide an improved sensor assembly to obviate prior art shortcomings and to allow precise temperature control of a heating surface to thereby enhance efficiency and lower energy consumption.

SUMMARY OF THE INVENTION

According to one aspect of the present invention, a sensor assembly for determining the temperature state in an area of a heating surface heated by a heat source and disposed between the heat source and the heating surface in parallel relationship to the heating surface, includes a first sensor having a carrier and a temperature-dependent resistor web which is attached to the carrier and confronts the heating surface and which is electrically contacted at a contact zone outside a temperature-measuring zone, and a second sensor having a carrier and a temperature-dependent resistor web which is attached to the carrier and electrically contacted at a contact zone outside the temperature-measuring zone and which confronts the heat source.

A sensor assembly according to the present invention enables a temperature measurement in the entire heating space so that prior art problems are resolved and an added safety feature is realized as far as temperature control is concerned in the event one sensor malfunctions or is incorrectly controlled. Moreover, the temperature measurement is more accurate. By knowing the temperature of the heat source, the temperature of the heating surface can be ascertained before it reaches the desired level so that the temperature or the heat source can be fine-tuned. As a result, the desired temperature of the heating surface can be reached more quickly or energy can be saved when maintaining the heating surface at the desired temperature because the heating surface temperature and the heat source temperature can be suited to one another in an optimum manner. The temperature sensors used for a sensor assembly according to the present invention can be manufactured cheaply so that the addition of a second temperature sensor is of no financial consequence. Operating safety and efficiency of the cooking platform is much enhanced as both the heating surface temperature and the heat source temperature can be ascertained at any time and determination of a characteristic temperature graph inside the heating unit is possible using a processor. This in turn can be used for calibrating and self-adjusting the heating unit.

According to another feature of the present invention, the heating surface may be a glass ceramic hot plate, and the carrier of the first and second sensors may be made of ceramic.

According to another feature of the present invention, the resistor web of the first sensor and/or the resistor web of the second sensor may be shaped in the form of a meander. Suitably, the resistor web of the first sensor and/or the resistor web of the second sensor may be made through a thick-film technique. In this way, the resistance pattern can be best suited in an easy manner to the application at hand.

According to another feature of the present invention, the first sensor and the second sensor may be made substantially identical in construction. Manufacture and storage are thus simple and cost-effective. As an alternative, the second sensor may be sized greater than the first sensor. In this way, the second sensor is able to protect the first sensor from exposure to heat radiating from the heat source so that the temperature measurement by the first sensor becomes more accurate. In addition, the second sensor may be constructed to absorb radiation to further shield the first sensor from the heat source.

According to another feature of the present invention, the resistor web of the first sensor and/or the resistor web of the second sensor may be greater, e.g. twice, in cross section in a transition zone than in an area of the temperature-measuring zone. As a result, the electric resistance per length of the resistor web is significantly reduced in this area so that the temperature measurement in this area is hardly affected.

According to another feature of the present invention, the sensor assembly may be constructed to have a configuration tapering toward a free end distal to the contact zone for improving mechanical stability. Thus, the carrier can be constructed light and in a material saving manner while still exhibiting sufficient mechanical stability, whereby shading of the heating coil in particular on the contact-distal end can be kept to a minimum by the carrier or can be selected great and dimensioned specific to a local in order to set the desired temperature gradient on the cooking platform and heating surface.

According to another feature of the present invention, the sensor assembly may be constructed to have a wide zone in an area of the contact zone, and a transition curved to a remaining narrow zone. Suitably, the transition is concave. In this way, material can be utilized efficiently without adversely affecting stability.

According to another feature of the present invention, the resistor web of the first sensor and/or the resistor web of the second sensor may have a length of at least 200 mm in the temperature-measuring zone. As a result, temperature is absorbed across an area of great spatial range, thereby further enhancing the accuracy of measurement.

According to another feature of the present invention, a contact piece of elastically yielding material may be provided for establishing contact of the resistor web of the first sensor and/or the resistor web of the second sensor in the contact zone, with the contact piece being connected, e.g. riveted, to the carrier of the resistor web of the first sensor and/or the resistor web of the second sensor. Sufficient contacting is hereby realized, even when exposed to frequent changing temperature stress.

According to another feature of the present invention, a closed thermally conductive passivation layer may be provided for insulating the resistor web of the first sensor and/or the resistor web of the second sensor. The resistor web is thus protected reliably from chemical impacts and retains its thermoelectric characteristic for a longer period so that a drift over time of the measuring range is minimized. In this way, rivets may also be shielded or covered.

According to another feature of the present invention, a retention element may be provided between the first sensor and the second sensor. In this way, a defined distance can be maintained. The provision of such a retention element insulates also the first sensor. The retention element may be implemented in the form of a bracket or may have the shape of a trough. Suitably, the bracket or the trough defines hereby a space for receiving insulating material. As a result, the retention element is simple in structure and stiff and has space for insulation material. As an alternative, the retention element may have a trough bottom which is formed with reinforcing grooves to define pockets for providing insulation. This effectively improves the insulation in a simple manner.

According to another feature of the present invention, a spring tongue may be attached to the second sensor and/or retention element and supported by the first sensor. As a result, the first sensor is precisely placed on the heating surface.

According to another feature of the present invention, the second sensor may, at least regionally, be connected to the retention element, and/or the retention element may have a receptacle for accommodating the first sensor. Thus, the second sensor can be supported precisely while being supported by the planar disposition of the first sensor. The disposition in the receptacle effects also a sealing of a void in the receptacle so that trapped air in the void can provide insulation.

According to another feature of the present invention, an elastically yielding connection element may be provided for connecting the first sensor, in particular the carrier thereof, in the area of the contact zone to the second sensor and/or retention element. Examples of a connection element include a spring, e.g. a metal spring, U-shaped spring, or Z-shaped spring. In this way, the first sensor can be precisely placed upon the heating surface. Suitably, the connection element may be connected thermally to the first sensor, second sensor, and/or retention element, in particular by using bolts and/or rivets. This ensures a secure connection of the elastically yielding connection element in the space between heating surface and heat source, even when subjected consistently to high temperatures.

According to another feature of the present invention, the retention element may have a receptacle for accommodating the first sensor, with the first sensor having a step-shaped configuration in an area of the contact zone to define a recessed zone which extends at a lower level than the connection element, wherein the resistor web of the first sensor extends in substantial parallel relationship to the resistor web of the second sensor, when the first sensor is disposed completely in the receptacle of the retention element. In this way, the first sensor can be securely placed flatly on the heating surface, even when using bolts and rivets because the heads of the bolts or rivets are prevented from bearing upon the heating surface. Suitably, the carrier of the first sensor may be made of several parts in an area of the recessed zone. This results in a particularly simple configuration of the carrier.

According to another feature of the present invention, a substantially angular restraining bracket may be connected, e.g. bolted or riveted, to the second sensor and/or retention element. This allows easy and flexible attachment to the surroundings or heating space or oven.

According to another feature of the present invention, the first sensor rests flatly on the heating surface in operative position and defines a wedge-shaped gap in combination with heads of rivets. As a consequence, the first sensor is coupled directly to the heating surface and the temperature indication is accurate.

According to another feature of the present invention, the restraining bracket may have a receptacle for accommodating the second sensor. In particular, the restraining bracket may have a bay for insertion of the second sensor.

According to another feature of the present invention, the restraining bracket in operative position may have a vertical surface formed with a vertical oblong hole for installation and adjustment. This allows easy assembly and adjustment of the sensor assembly.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIGS. 1 to 23 depict various embodiments and details of a sensor assembly according to the present invention for determining a temperature state in the area of a heating surface 15 which has been heated by a heat source 16 and may be a glass ceramic hot plate for example. The sensor assembly is intended for use in particular for glass ceramic areas of kitchen stoves and has dimensions that can be suited to the application at hand. The sensor assembly is positioned between the heat source 16 and the heating surface in parallel relationship to the heating surface. The heating surface 15 and the heat source 16 are shown in detail in FIGS. 19 and 20.

Figure 1:
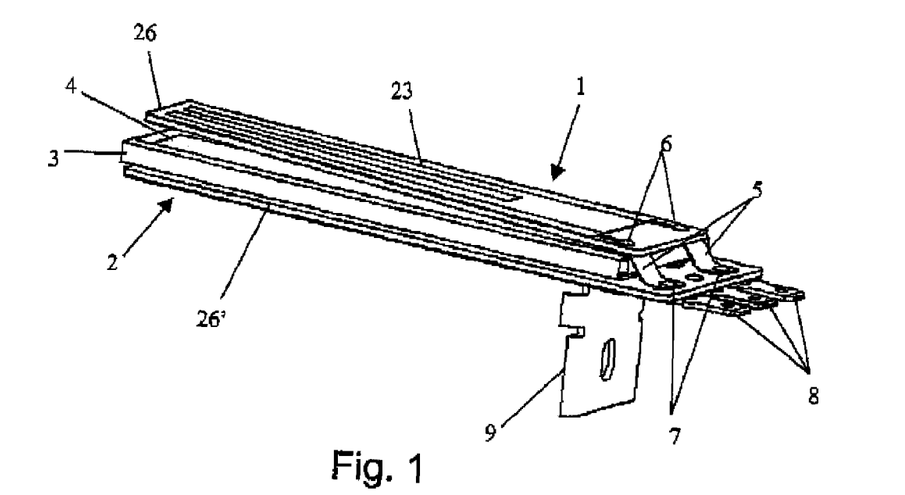
FIG. 1 is an axonometric view of a first embodiment of a sensor assembly according to the present invention.
Figure 2:
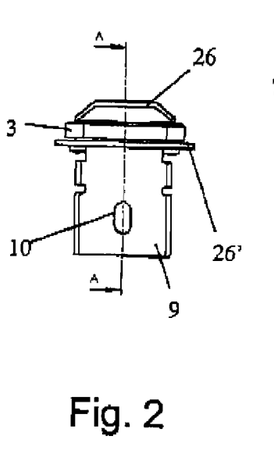
FIG. 2 is a side view of the sensor assembly.
Figure 3:
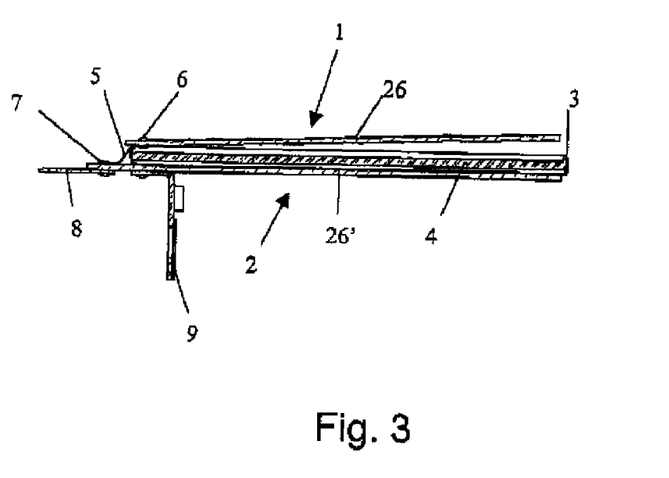
FIG. 3 is a cross sectional view of the sensor assembly.

FIGS. 1 to 3 show the basic principle of a sensor assembly according to the present invention. The sensor assembly includes a first sensor 1 arranged on a first carrier 26 and a second sensor 2 arranged on a second carrier 26'. Carrier 26 bears a resistor web 23. Likewise, carrier 26' also bears a resistor web of similar construction which is, however, not shown in the drawings. The resistor web 23 is in electrical contact with two of contact elements 8 via rivets 6, contact pieces 5 and rivets 7. The resistor web of sensor 2 provided on carrier 26' is in direct contact with two of contact elements 8. In the particular embodiment of FIGS. 1 to 3, the contact pieces 5 are S-shaped. The sensor assembly further has a retention element 3 with a receptacle 4. For reasons of mounting, the sensor assembly has a mounting bracket 9 with a hole 10.

Figure 4:
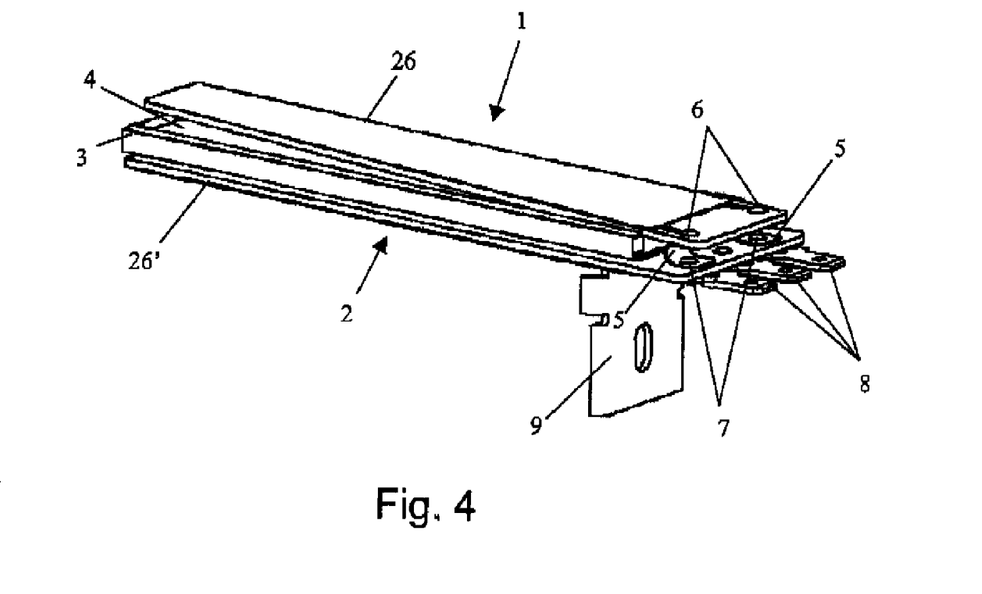
FIG. 4 is an axonometric view of a second embodiment of a sensor assembly according to the present invention.
Figure 5:
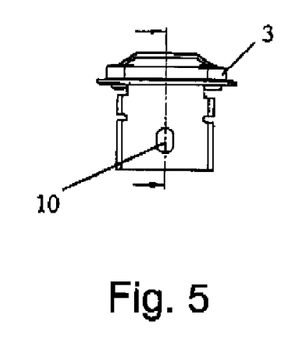
FIG. 5 is a side view of the sensor assembly of FIG. 4.
Figure 6:
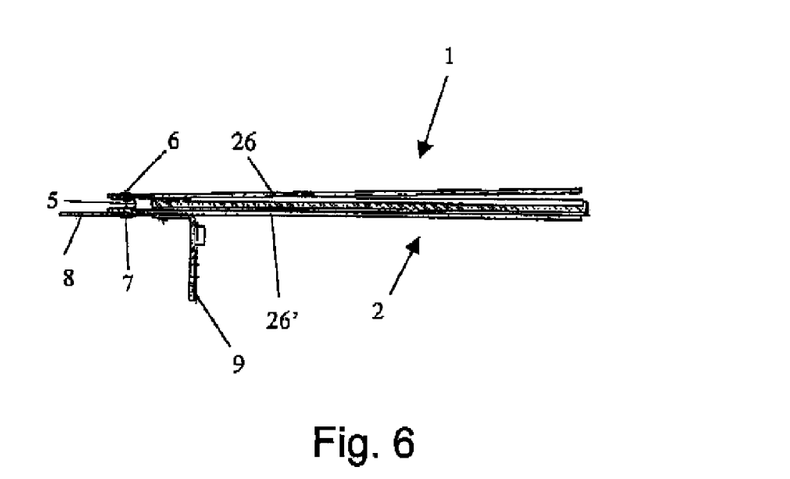
FIG. 6 is a cross sectional view of the sensor assembly of FIG. 4.

FIGS. 4 to 6 show another embodiment of the present invention. For sake of simplicity, identical and similar features that have already be described with regard to FIGS. 1 to 3 will not be explained again. For ease of illustration, the resistor web 23 actually provided on sensor 1 is not shown in FIGS. 4 to 20. It is however to be understood that a temperature sensitive web has to be provided for proper functioning of the sensor assembly. The embodiment of FIGS. 4 to 6 differs from the one shown in FIGS. 1 to 3 in that the contact pieces 5 are U-shaped. Hence, the first sensor carrier 26 is longer and covers rivets 7 (see FIG. 6).

Figure 7:
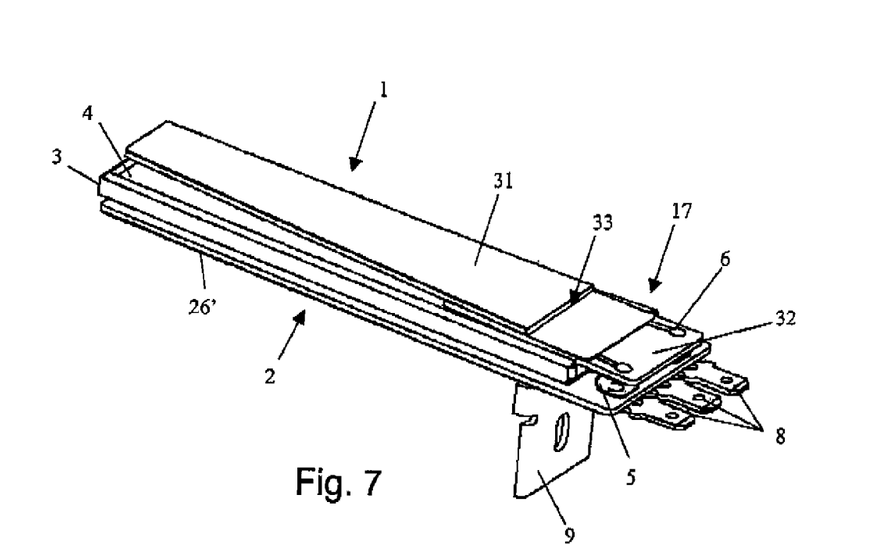
FIG. 7 is an axonometric view of a third embodiment of a sensor assembly according to the present invention.
Figure 8:
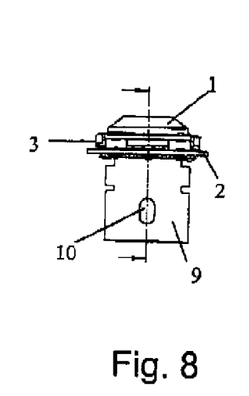
FIG. 8 is a side view of the sensor assembly of FIG. 7.
Figure 9:
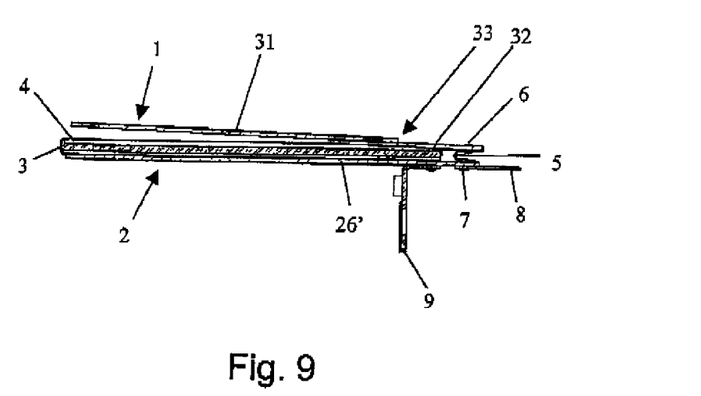
FIG. 9 is a cross sectional view of the sensor assembly of FIG. 7.

FIGS. 7 to 9 show yet another embodiment of the present invention. Sensor 1 has two carrier parts 31 and 32. It therefore has a recess 33 and a recessed zone 17.

Figure 10:
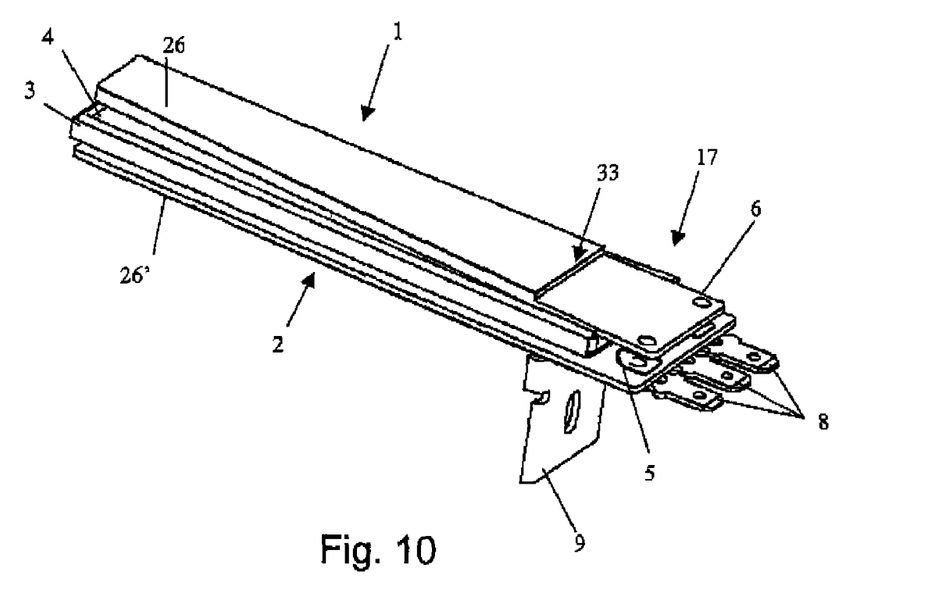
FIG. 10 is an axonometric view of a fourth embodiment of a sensor assembly according to the present invention.
Figures 11, 12:
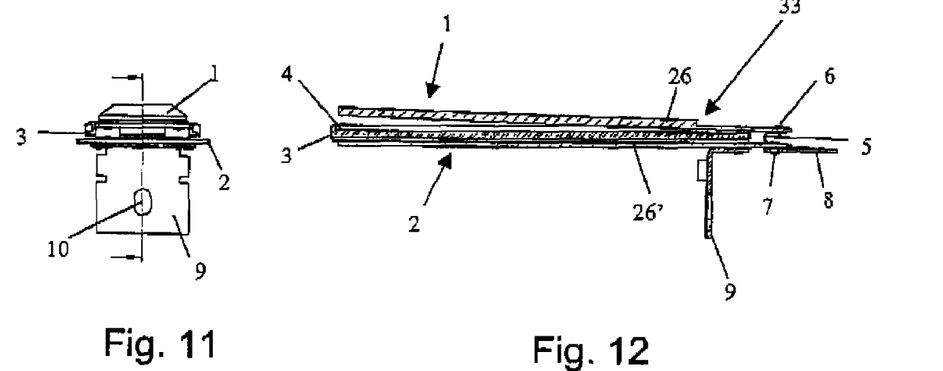
FIG. 11 is a side view of the sensor assembly of FIG. 10.
FIG. 12 is a cross sectional view of the sensor assembly of FIG. 10.

FIGS. 10 to 12 show yet another embodiment of the present invention. Sensor 1 has a single carrier 26. It also has a recess 33 and a recessed zone 17. However, recess 33 and recessed zone 17 form integral parts of the carrier 26.

Figure 13:
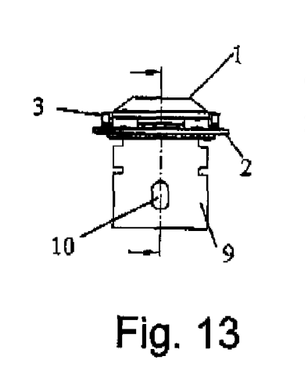
FIG. 13 is a side view of a fifth embodiment of a sensor assembly according to the present invention.
Figure 14:
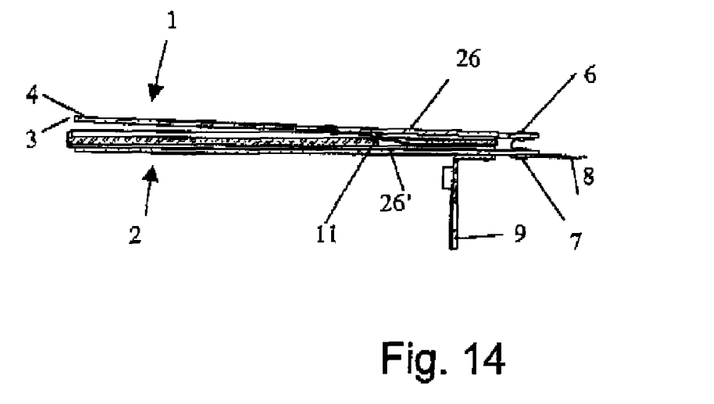
FIG. 14 is a cross sectional view of the sensor assembly of FIG. 13.

FIGS. 13 and 14 show yet another embodiment of the present invention. A spring tongue 11 is provided here between sensor 1 and sensor 2. This tongue 11 urges sensor 1 upwards and hence—in use—towards the heating surface 15. It therefore ensures proper contact to the heating surface 15 which allows more accurate temperature measurements. This embodiment includes a retention element 3 isolating the sensor 1 from the heat source 16 (the latter being shown in FIG. 20 but not in FIGS. 13 and 14).

Figure 15:
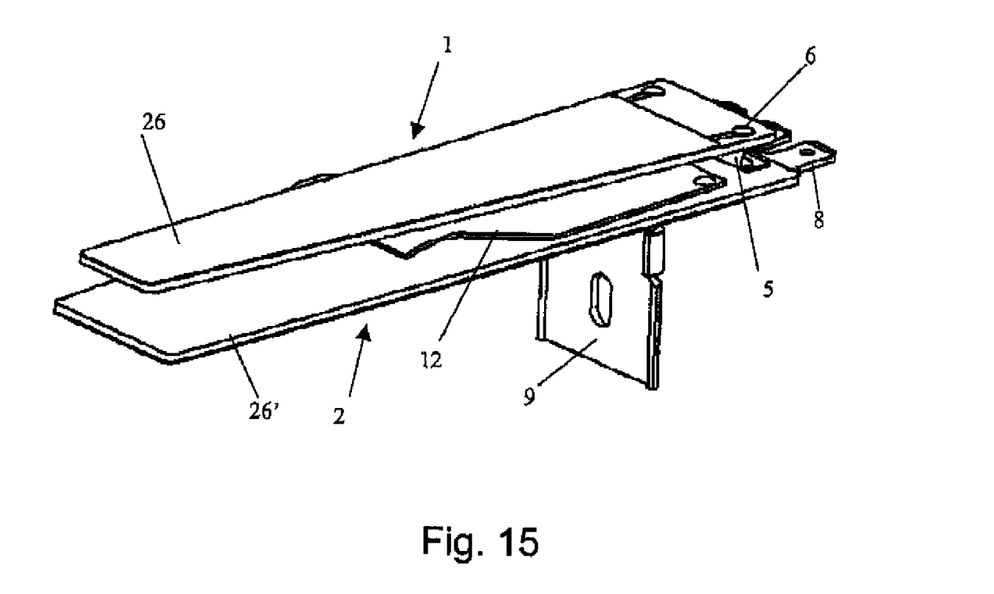
FIG. 15 is an axonometric view of a sixth embodiment of a sensor assembly according to the present invention.
Figure 16:
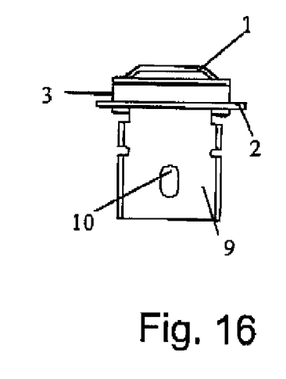
FIG. 16 is a side view of the sensor assembly of FIG. 15.
Figure 17:
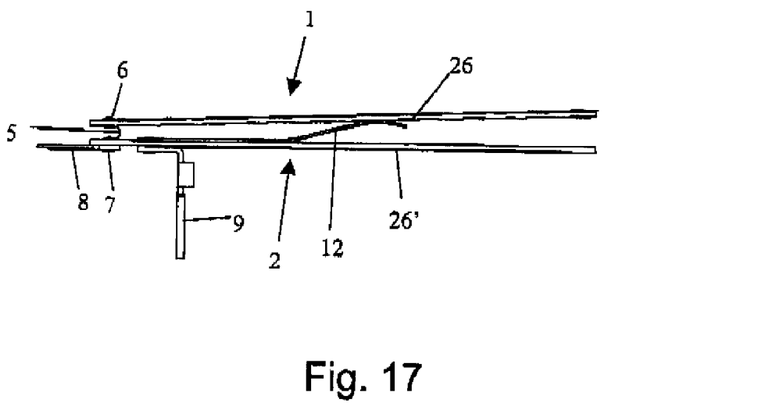
FIG. 17 is a cross sectional view of the sensor assembly of FIG. 15.

FIGS. 15 to 17 show yet another embodiment of the present invention. This embodiment is similar in structure than the embodiment of FIGS. 13 and 14, with the difference residing in the absence of the retention element. Therefore, this embodiment is very simple in structure.

Figure 18:
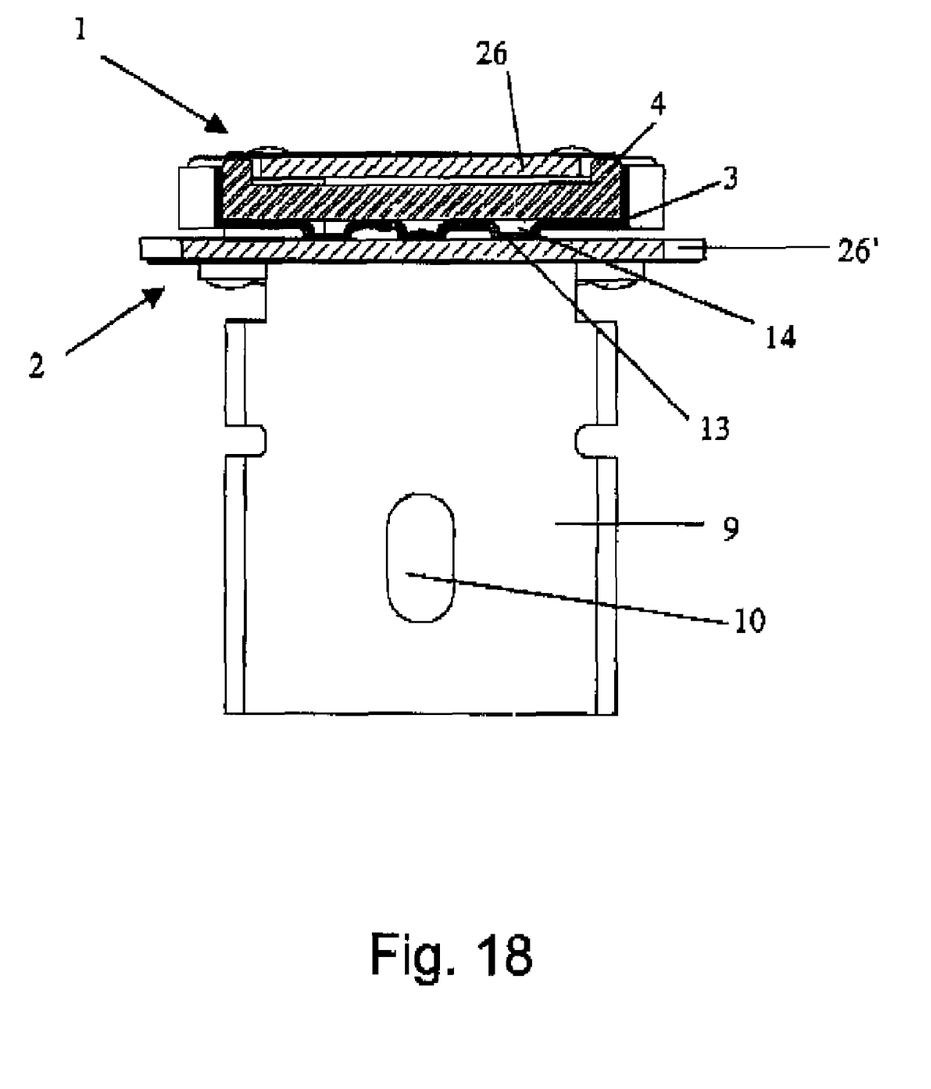
FIG. 18 is a cross sectional view of a seventh embodiment of a sensor assembly according to the present invention.

FIG. 18 shows a detail of yet another embodiment of the present invention. In this embodiment a particular shape of the retention element 3 is shown. The retention element 3 has grooves 1 forming reinforcement ribs having voids 14 therein. This particular shape provides both enhanced stability and, due to the voids 14, better insulating properties.

Figure 19:
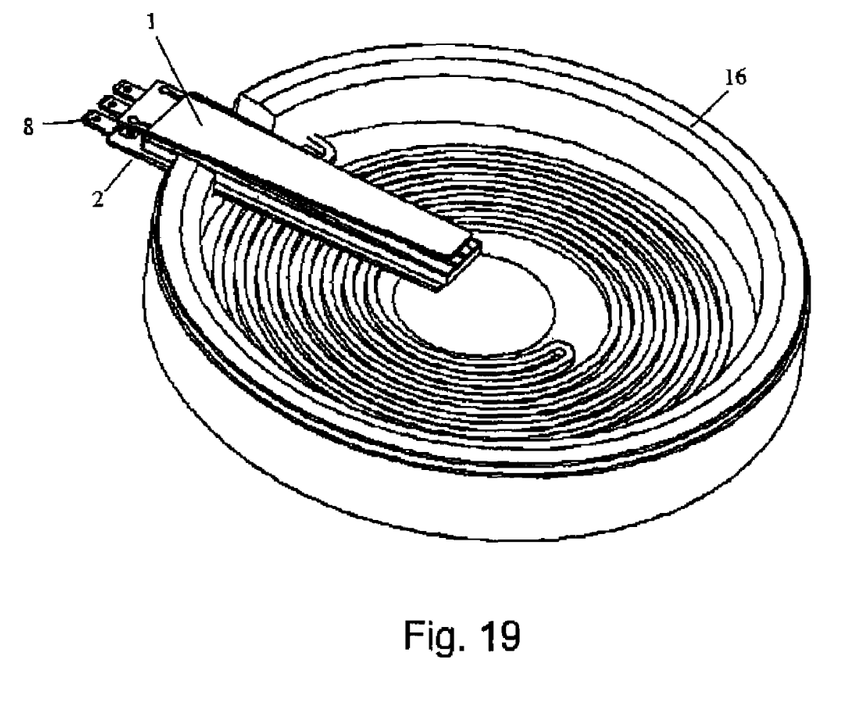
FIG. 19 is an axonometric view of sensor assembly according to the present invention in combination with a heat source.
Figure 20:
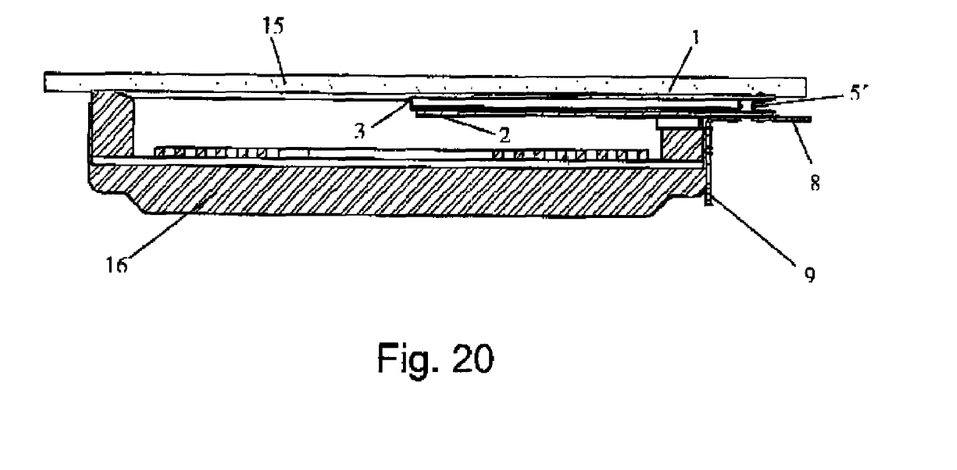
FIG. 20 is a cross sectional view of the sensor assembly of FIG. 19.

FIGS. 19 and 20 shows a sensor assembly according to the present invention installed in an electric stove with a heating surface 15 and a heat source 16.

Figure 21:
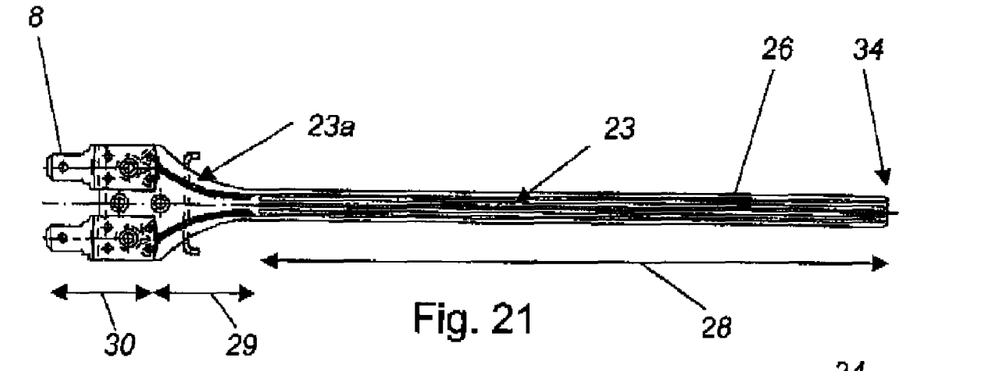
FIG. 21 is a top view of a first sensor of a sensor assembly according to the present invention.
Figure 22:
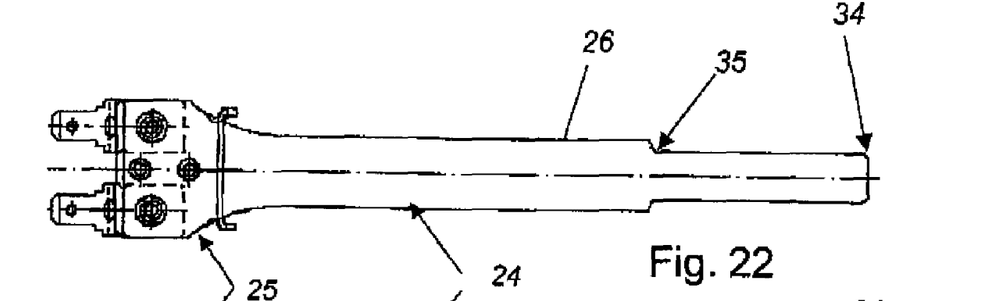
FIG. 22 is a top view of a modified first sensor of a sensor assembly according to the present invention.
Figure 23:
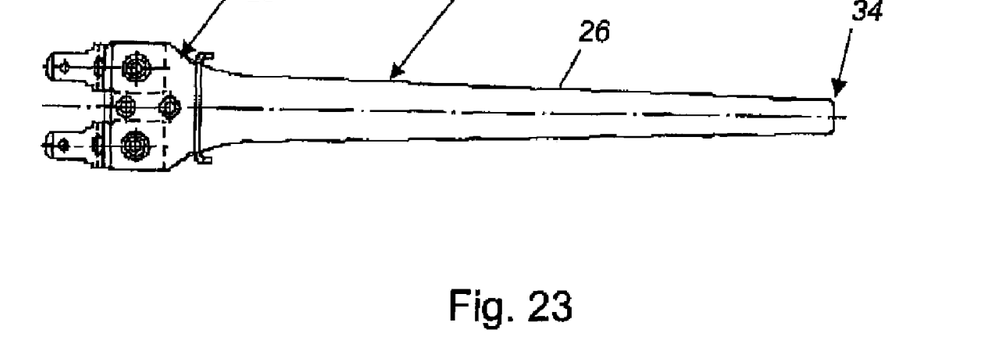
FIG. 23 is a top view of a yet another variation of a first sensor of a sensor assembly according to the present invention.

FIGS. 21 to 23 show top views of different embodiments of the first sensor 1 of a sensor assembly according to the invention. In particular, different shapes of the carrier 26 are shown. Although the different zones are only depicted in FIG. 21, each of the three carriers of FIGS. 21 to 23 comprises, in principle, a temperature measuring zone 28 with a resistor web 23 thereon, a transition zone 29 and a contact zone 30 provided with contact pieces 8. While the carrier 26 in FIG. 21 has a general rectilinear shape, the carrier 26 in FIGS. 22 and 23 are of smaller diameter at the distal end 34 of the carrier 26. In the embodiment of FIG. 22 the transition from the wider to the narrower carrier region is realized by a step 35 while in the embodiment of FIG. 23 the transition continues. Both arrangements reduce the weight of the carrier 26 at the distal end 34. This in turn provides less distortion and hence better stability and enhanced measuring accuracy of the sensor.

The sensor assembly according to the present invention essentially includes a first sensor 1 and at least one second sensor 2. The sensor 1 has a carrier 26, which may be made of ceramic, and at least one temperature-dependent resistor web 23, which is shown by way of example in FIGS. 1 and 21 and arranged on the carrier 26. The resistor web 23 is not shown in the other figures for reasons of better comprehensibility of the drawings. The resistor web 23 of the sensor 1 faces the heating surface 15 and is electrically contacted outside a temperature-measuring zone 28 of the sensor 1 to a contact zone 30 with contact pieces 8. The sensor 2 has a carrier 26', which may be made of ceramic, and at least one temperature-dependent resistor web (not shown but similar to that on sensor 1), which is arranged on the carrier 26' of the sensor 2 and faces the heat source 16 (FIG. 20). When assembled, the sensor 1 rests as flatly as possible and directly upon an underside of the heating surface 15.

As indicated in FIGS. 1 and 21, the resistor web 23 of the sensor 1 and/or sensor 2 may have a meandering configuration and is made preferably through thick-film technique. Any configuration of meander shape may be possible. As a result of the meander shape, the temperature-measuring zone 28 which is especially temperature-sensitive can be defined. Although the meander shape is currently preferred, any other configuration of the resistor web 23 is, of course, possible as well. While the application of thick-film technique, using especially a screen printing process, is currently preferred, thin-film technique or other processes at the disposal of the artisan are, of course, also conceivable. The sensors 1, 2 may be of substantially identical construction for cost-saving reasons; currently preferred is however a configuration in which the sensor 2 is made of greater size than the sensor 1 so that the sensor 2 is able to shield the sensor 1 from heat radiating from the heat source 16, as shown by way of example in FIGS. 1 to 20. Shielding of the sensor 1 can further be enhanced by making the sensor 2 radiation-absorbent.

The temperature measuring zone 28 can be further adjusted by making the resistor web 23 of the sensor 1 and/or the resistor web of the sensor 2 in a transition zone 29 between the contact zone 30 and the temperature-measuring zone 28 of a cross section 23a which is greater than, in particular twice, a cross section in the temperature-measuring zone 28. Greater cross section 23a means smaller resistance and less temperature sensitivity which is desired in the transition zone 29.

The stability of the sensor assembly can be enhanced by tapering the sensor carrier 26 and/or 26' assembly in a direction to a free end which is distal to the contact zone 30. As a result, only a small portion of the heat source 16 is shielded from the heating surface 15. In addition, this effect can be further enhanced by providing the sensor assembly in the area of the contact zone 30 with a wider portion 25 (FIGS. 22, 23), with a transition from the wider portion 25 to the remaining narrower portion 24 of the sensor assembly being curved, suitably concavely curved.

Suitably, the resistor web 23 of the sensor 1 and/or sensor 2 has a length of at least 200 mm in the temperature-measuring zone 28 so as to be able to suit the temperature sensitivity. The resistor web(s) 23 must be securely electrically contacted consistently even when exposed to widely varying thermal conditions. Suitably, the resistor web(s) 23 is contacted by at least one contact piece 5 which is made of elastically yielding material and connected, e.g. riveted, to the respective carrier. It is also possible to insulate the resistor web(s) 23 by a closed thermally conductive passivation layer (not shown) which, when having sufficient width, is able to cover or screen any unevenness, caused, e.g., by bolt heads and/or rivets 6, 7. As a result, the sensor 1 rests flatly against the heating surface 15.

In view of the affect that the heat source 16 may have on the sensor 1, the sensor 1 is isolated from the heat source 16 by disposing a retention element 3 between the sensor 1 and sensor 2, see FIGS. 1 to 14, 18 and 20. The retention element 3 may be configured as a bracket or have a trough shape to define a receptacle 4 for accommodating insulating material (not shown). The retention element 3 may be made of any suitable thermally stable material, e.g. ceramic or stainless steel. As shown in FIG. 18, the retention element 3 has a bottom formed with grooves 13 to provide reinforcement ribs with voids 14 for insulation.

FIGS. 13 and 14 show an embodiment of a sensor assembly, having a spring tongue 11 for urging the sensor 1 against the heating surface 15. The spring tongue 11 is connected to the sensor 2. In the sensor assembly of FIGS. 15, 16 and 17, the sensor 1 is biased by a spring tongue 12 which is secured to the sensor 2. The spring tongue 11, 12 may be a metal spring.

The sensor 2 is at least regionally connected to the retention element 3 and bears flatly against the retention element 3.

The retention element 3 has preferably the shape of a trapezoidal frame or the shape of a trough with trapezoidal or rectangular configuration, with an underside and inner side of the trough having preferably plane-parallel plates. As a result, the sensors 1, 2 bear against the retention element 3. The receptacle 4 of the retention element 3 may be provided in either variation, i.e. when the retention element 3 is configured as frame or as trough.

As the sensor 1 should rest flatly upon the heating surface 15, the sensor 1, in particular the carrier 26 of the sensor 1, is connected in the area of the contact zone 30 to the sensor 2 and/or retention element 3 by at least one elastically yielding contact piece 5, e.g. a spring such as a metal spring, U-shaped spring (FIGS. 4-6, 7-9, 10-12, 13, 14, 15-17), or Z-shaped spring (FIGS. 1-3). To connect the elastically yielding contact piece 5 reliably and consistently to the sensor 1, sensor 2, and/or retention element 3, the use of thermally stable connection means are provided, such as bolts and/or rivets 6, 7. Rivets in particular are reliable, thermally stable, cheap, and allow automatic installation.

When using rivets 6, 7 or bolts or like fasteners, the heads of the fasteners 6, 7 jut out beyond the surface of the sensor 1 to prevent a flat abutment of the sensor 1. While this may be acceptable is some instances whereby the heads of the fasteners 6, 7 form a wedge-shaped gap, it is however preferred to implement a flat abutment of the sensor 1 against the heating surface 15. This may be attained by applying a thermally conducting passivation layer upon the surface of the sensor 1, with the passivation layer covering also the heads of the fasteners 6, 7. As an alternative, or in addition, the sensor 1 is formed in the area of the contact zone 30 with a step-shaped recessed zone 17 which extends at a lower level as the thermally stable connection means, as shown in FIGS. 7 and 9. When the sensor 1 is completely received in the receptacle 4 of the retention element 3, the resistor web 23 of the sensor 1 extends in substantial parallel relationship to the sensor 2. The step-shaped recessed zone results in a flat abutment of the sensor 1 upon the heating surface 15 in the absence of any interference by the heads of the fasteners 6, 7.

Suitably, the carrier of the sensor 1 is of multipart configuration in the area of the recessed zone 17. In this way, the part that is relevant for the measurement, i.e. the part of the carrier 26 with the measuring zone 28, can be configured as a flat part that can be connected to a further part to form a step, as shown in FIGS. 7 and 9.

In the embodiment shown in FIGS. 7 to 9, the sensor 1 is made up of two carrier parts 31 and 32. By arranging the two carrier parts 31 and 32 as shown in FIGS. 7 and 8 a recess 33 and hence recessed zone 17 is formed.

FIGS. 10 to 12 show an alternative to form the recess 33 and hence a recessed zone 17. As shown in FIGS. 10 and 12, the sensor 1 has a single piece carrier 26. The recess 33 is already an integral part of the carrier 26 and can be applied by grinding or other abrasive treatment of the carrier 26.

With regard to FIGS. 1 to 20, installation and adjustment in a heating space formed by the heat source 16 and the heating surface 15 is realized by using a mounting bracket 9 of substantially angular shape. The mounting bracket 9 is connected to the sensor 2 and/or the retention element 3, e.g. by riveting ort bolting. When connected to the retention element 3, the mounting bracket 9 can have a pocket or bay (not shown) for receiving the sensor 2. This allows easy installation of the sensor 2. The mounting bracket 9 has a vertical oblong hole 10 to facilitate assembly and adjustment.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and include equivalents of the elements recited therein:

What is claimed is:

1. A sensor assembly for determining the temperature state in an area of a heating surface heated by a heat source and disposed between the heat source and the heating surface in parallel relationship to the heating surface, said sensor assembly comprising:

a first sensor having a carrier and a temperature-dependent resistor web which is attached to the carrier and confronts the heating surface and which is electrically contacted at a contact zone outside a temperature-measuring zone; and a second sensor having a carrier and a temperature-dependent resistor web which is attached to the carrier and electrically contacted at a contact zone outside the temperature-measuring zone and which confronts the heat source.

2. The sensor assembly of claim 1, wherein the heating surface is a glass ceramic hot plate.

3. The sensor assembly of claim 1, wherein the carrier of the first sensor is made of ceramic.

4. The sensor assembly of claim 1, wherein the carrier of the second sensor is made of ceramic.

5. The sensor assembly of claim 1, wherein at least one of the resistor web of the first sensor and the resistor web of the second sensor is shaped in the form of a meander.

6. The sensor assembly of claim 1, wherein at least one of the resistor web of the first sensor and the resistor web of the second sensor is made through a thick-film technique.

7. The sensor assembly of claim 1, wherein the first sensor and the second sensor are substantially identical in construction.

8. The sensor assembly of claim 1, wherein the second sensor is of a greater size than the first sensor.

9. The sensor assembly of claim 1, wherein the second sensor is constructed to absorb radiation.

10. The sensor assembly of claim 1, wherein at least one of the resistor web of the first sensor and the resistor web of the second sensor is greater in cross section in a transition zone than in an area of the temperature-measuring zone.

11. The sensor assembly of claim 1, wherein at least one of the resistor web of the first sensor and the resistor web of the second sensor is twice in cross section in a transition zone than in an area of the temperature-measuring zone.

12. The sensor assembly of claim 1, constructed to have a configuration tapering toward a free end distal to the contact zone for improving mechanical stability.

13. The sensor assembly of claim 1, constructed to have a wide zone in an area of the contact zone, and a transition of curved configuration to a remaining narrow zone.

14. The sensor assembly of claim 1, wherein the transition is curved concavely.

15. The sensor assembly of claim 1, wherein at least one of the resistor web of the first sensor and the resistor web of the second sensor has a length of at least 200 mm in the temperature-measuring zone.

16. The sensor assembly of claim 1, further comprising a contact piece of elastically yielding material for establishing contact of at least one of the resistor web of the first sensor and the resistor web of the second sensor in the contact zone, said contact piece being connected to the carrier of the least one of the resistor web of the first sensor and the resistor web of the second sensor.

17. The sensor assembly of claim 16, wherein the contact piece is riveted to the carrier.

18. The sensor assembly of claim 1, further comprising a closed thermally conductive passivation layer for insulating at least one of the resistor web of the first sensor and the resistor web of the second sensor.

19. The sensor assembly of claim 1, further comprising a retention element between the first sensor and the second sensor.

20. The sensor assembly of claim 19, wherein the retention element has the shape of a bracket or a trough.

21. The sensor assembly of claim 20, further comprising insulating material disposed in a space defined by the bracket or the trough.

22. The sensor assembly of claim 19, wherein the retention element has the shape of a trough having a bottom formed with reinforcing grooves to define pockets for providing insulation.

23. The sensor assembly of claim 19, further comprising a spring tongue attached to at least one of the second sensor and retention element and supported by the first sensor.

24. The sensor assembly of claim 19, wherein the second sensor has at least an area for connection to the retention element.

25. The sensor assembly of claim 19, wherein the retention element has a receptacle for accommodating the first sensor.

26. The sensor assembly of claim 19, further comprising an elastically yielding connection element for connecting the first sensor in the area of the contact zone to at least one of the second sensor and retention element.

27. The sensor assembly of claim 26, wherein the connection element is a spring.

28. The sensor assembly of claim 26, wherein the connection element is a metal spring.

29. The sensor assembly of claim 26, wherein the connection element is a U-shaped spring.

30. The sensor assembly of claim 26, wherein the connection element is a Z-shaped spring.

31. The sensor assembly of claim 26, wherein the connection element is connected thermally to at least one of the first sensor, second sensor, and retention element.

32. The sensor assembly of claim 31, further comprising fastening means including bolts and/or rivets for connecting the connection element to at least one of the first sensor, second sensor, and retention element.

33. The sensor assembly of claim 26, wherein the retention element has a receptacle for accommodating the first sensor, said first sensor having a step-shaped configuration in an area of the contact zone to define a recessed zone which extends at a lower level than the connection element, with the resistor web of the first sensor extending in substantial parallel relationship to the resistor web of the second sensor, when the first sensor is disposed completely in the receptacle of the retention element.

34. The sensor assembly of claim 33, wherein the carrier of the first sensor is made of several parts in an area of the recessed zone.

35. The sensor assembly of claim 19, further comprising a substantially angular restraining bracket connected to at least one of the second sensor and retention element.

36. The sensor assembly of claim 19, further comprising a substantially angular bracket riveted or bolted to at least one of the second sensor and retention element.

37. The sensor assembly of claim 1, wherein the first sensor rests flatly on the heating surface in operative position and defines a wedge-shaped gap in combination with heads of rivets.

38. The sensor assembly of claim 35, wherein the restraining bracket has a receptacle for accommodating the second sensor.

39. The sensor assembly of claim 35, wherein the restraining bracket has a bay for insertion of the second sensor.

40. The sensor assembly of claim 35, wherein in operative position the restraining bracket has a vertical surface formed with a vertical oblong hole for installation and adjustment.

* * * * *